Feb. 11, 1947.  S. KELLOGG, 2D., ET AL  2,415,429
AIRCRAFT ALTITUDE CONTROL
Filed Feb. 13, 1942
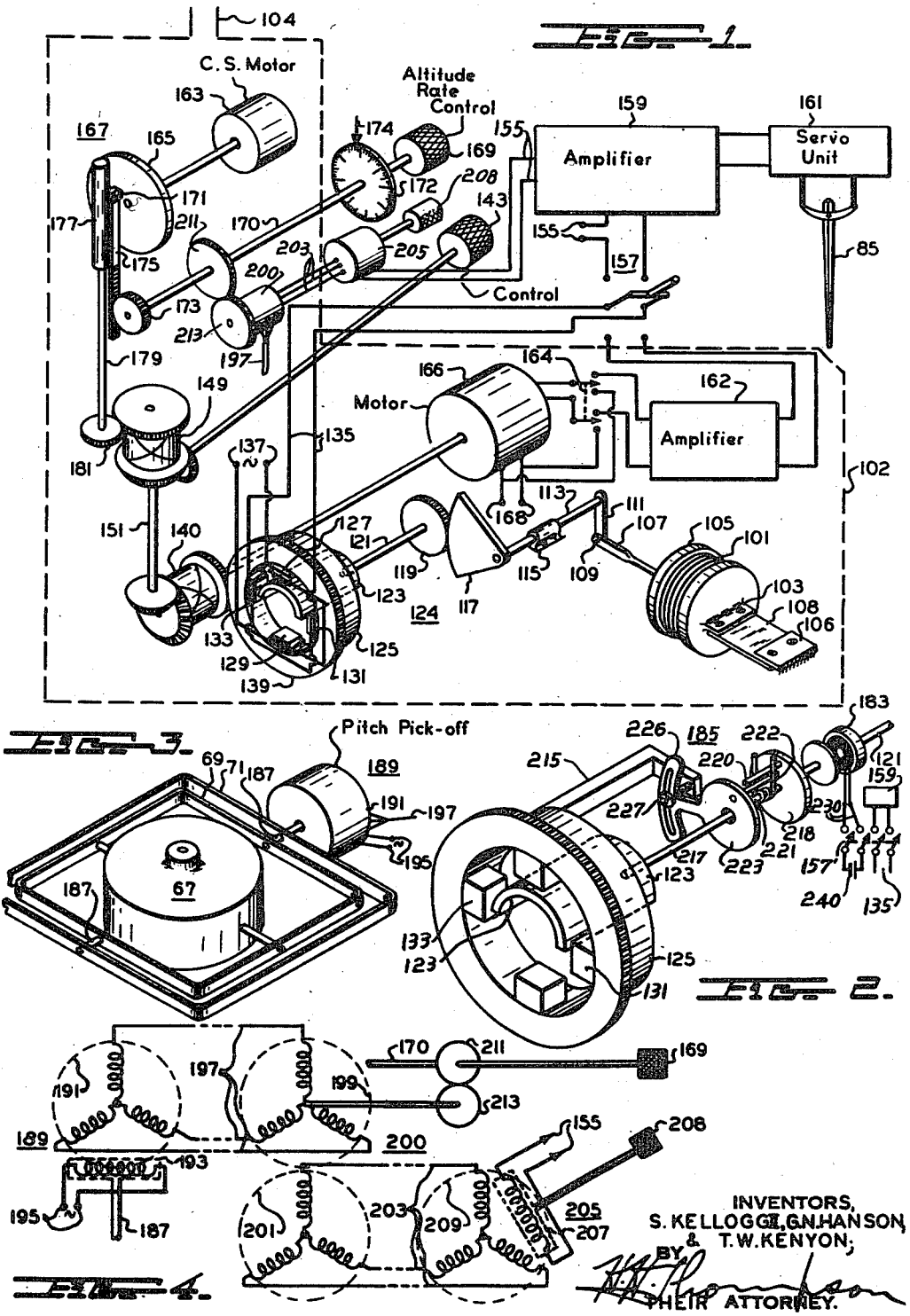
INVENTORS,
S. KELLOGG II, G.N. HANSON
& T.W. KENYON;
BY
THEIR ATTORNEY.

Patented Feb. 11, 1947

2,415,429

UNITED STATES PATENT OFFICE 2,415,429

AIRCRAFT ALTITUDE CONTROL

Spencer Kellogg, 2nd, Rye, N. Y., Gerald N. Hanson, Allendale, N. J., and Theodore W. Kenyon, Huntington, N. Y., assignors to Sperry Gyroscope Company, Inc., Brooklyn, N. Y., a corporation of New York Application February 13, 1942, Serial No. 430,736

17 Claims. (Cl. 244—77)

The present invention is concerned with altitude control of aircraft and especially with the provision of automatic level flight and constant rate of climb or glide control. The present application is a modification of copending application Serial No. 429,754, for Altitude control for aircraft, filed February 6, 1942, in the name of Carl A. Frische and Gerald N. Hanson.

The use of automatic pilots on aircraft has generally been directed to the attitude control of the craft about three axes of the craft, namely, in azimuth, pitch and roll. Such automatic pilots have been effective in maintaining the craft at a constant, usually level, attitude. However, air conditions may be such that, although the attitude of the craft is maintained constant, the entire craft itself will be subject to accelerations and decelerations in many directions due to air pockets, gusts, etc., which may render flight extremely erratic and uncomfortable to passengers as well as causing undue stresses and strains in the aircraft and its controls.

The present invention is directed towards a direct altitude control of an aircraft, which may be combined with an attitude control whereby the craft may be maintained at a constant altitude as well as in a predetermined attitude. In addition, means are provided for changing altitude either by fixed amount or at a continuous rate, as during climb or glide.

One such device, operating a pneumatically controlled automatic pilot of the type disclosed in U. S. Patent 1,992,970, is shown in prior application Serial No. 429,754. The present invention is directed toward improved electrical control means for operating with an electrically controlled automatic pilot, but some features have application to all types of automatic pilots and to units thereof other than pitch and altitude units.

Accordingly, it is an object of the present invention to provide improved devices for controlling the altitude of an aircraft.

It is another object of the present invention to provide improved devices for maintaining an aircraft at constant altitude.

It is a further object of the present invention to provide improved devices for controlling the flight of an aircraft with constant rate of change of altitude.

Still another object of the present invention is to provide improved devices for combining altitude and attitude control of aircraft.

A still further object of the present invention is to provide an improved electrical pick-off device for use with electrical control systems.

Another object of the present invention is to provide improved devices for maintaining an altitude control zeroized when not in use, whereby its activation will place the craft promptly under its control without undue shock or change.

A further object of the present invention is to provide improved devices for controlling the altitude of a craft in response to a scaled barometric unit provided with temperature compensation and means for linearizing its output with respect to altitude.

Still another object of the present invention is to provide improved combined attitude and altitude control for aircraft, including means for modifying the attitude control during continuing changes in altitude.

Further objects and advantages of the present invention will be apparent from the attached specification and drawing in which, Fig. 1 shows one embodiment of the system of the invention.

Fig. 2 shows a modification of a portion of the device of Fig. 1.

Figs. 3 and 4 show a further modification of the invention including means for modifying the action of the automatic pilot in pitch during climb or glide.

Referring to Fig. 1, there is shown the system of the invention as applied to an electrically controlled servo system for automatically controlling aircraft, such as shown in copending application Ser. No. 284,642, for Electro-hydraulic servo system, filed July 15, 1939, in the name of C. A. Frische, G. P. Bentley and P. Halpert or in copending application Ser. No. 407,460, for Electrical control systems, filed August 19, 1941, in the name of P. Halpert, C. A. Frische, J. L. Bird and O. E. Esval. Each of these prior applications shows an automatic pilot system in which a reversible-phase, variable magnitude, alternating signal voltage is produced corresponding to a desired control action. This signal voltage is then amplified and actuates a suitable electrical or hydraulic servo system, whereby the craft controls are operated in direction and extent in accordance with the phase and magnitude of the signal voltage. Although the prior applications were disclosed primarily with respect to rudder control, it will be clear that the same control systems may be used for elevator or aileron control of aircraft. In the present invention such a system is used for the elevator control, whereby the altitude of the craft may be suitably controlled.

In Fig. 1, reference numeral 101 shows a sealed bellows type of barometric unit which, as is well known, will expand or contract in accordance with the pressure to which it is subjected. Barometric unit 101 is preferably not completely exhausted but left with a very small remaining air pressure of the order of a few millimetres of water, being just sufficient to compensate for the effect of temperature changes in expanding and contracting the bellows 101 and the housing and mounting of the unit to be described, and thereby rendering the unit independent of temperature, as will be described.

This unit is entirely enclosed in an air tight housing indicated generally by dotted line 102, which is connected as by a duct 104 to a source of Pitot static pressure whereby the bellows 101 is subjected to only the static air pressure outside the craft and accurately indicates by its expansion the altitude of the craft. One end 103 of the bellows is fixed to the craft as at 106 by means of a flat spring 108. The other end 105 of bellows 101 is attached to a link 107 which is thereby translated in accordance with the altitude of the craft. Link 107 is pivotally connected as at 109 to a crank arm 111 which is rigidly fastened to a shaft 113 journalled in a bearing 115 fixed to the craft. Spring 108 permits the necessary deviation of shaft 107 as the bellows expands and contracts, but is stiff enough to transmit the expansion of bellows 101 to shaft 107. Fastened to the shaft 113 is a gear sector 117 meshing with a pinion 119 fixed to a shaft 121.

Shaft 121 actuates the sensitive element of a pick-off device 124, shown as an armature member 123 formed as a semi-cylinder of magnetic material. Coaxial with shaft 121 and pick-off armature member 123 is the pick-off housing 125 containing four field poles symmetrically located, each having wound thereon a coil such as coils 127, 129, 131 and 133, respectively. These poles are equally spaced about the axis of the pick-off device, one pair of opposite coils 131 and 133 being connected in opposing series relation to output wires 135 while the remaining pair of coils 127 and 129 are energized from a suitable source 137 of alternating current in such manner as to simultaneously provide like magnetic poles.

It will be clear that with pick-off armature 123 in the central and symmetrical position shown in Fig. 1, equal voltages will be induced in pick-up coils 131 and 133, resulting in zero voltage across output wires 135. If pick-off armature 123 is displaced from the position shown in either direction the voltage induced in one of coils 131, 133 will be greater than in the other and the resulting unbalance will appear as a variable magnitude reversible phase alternating voltage across output wires 135.

Pick-off 124 therefore acts to convert the relative displacement between armature 123 and housing 125 into an alternating signal voltage corresponding in phase to the sense of this displacement and in magnitude to the magnitude of the displacement. The relation between signal magnitude and displacement magnitude may be made to have any desired form, as by suitably forming the pole faces of housing 125. If these pole faces are formed cylindrically and concentric with the axis of armature 123, the signal will vary linearly with angular displacement until the armature 123 clears the poles. Thereafter, the signal will remain substantially constant with increased displacement. If the pole faces are formed flat, as shown, the signal will increase more rapidly for small displacements, and will asymptotically approach the substantially constant value for large displacements. Other forms may be used, suited to the particular use of the pick-off, which is in no way restricted to the use here shown.

It will also be clear that the voltage appearing across output terminals 135 will maintain the same phase during displacements of pick-off armature 123 in either direction from the central position up to 180 degrees in magnitude, so that for a full 360 degrees of rotation of armature 123, a useful voltage output will be obtained from this device. However, where it is not necessary to provide more than 90 degrees of useful control signal, one of the two energizing poles may be eliminated.

The output signal voltage appearing between output wires 135 is used as a control voltage for the aircraft elevators 85 in the same manner as shown in either of copending applications 284,642 or 407,460 above referred to. As is therein shown, the reversible phase variable magnitude signal voltage, such as the voltage appearing between wires 135 is fed to a suitable rate amplifier 159 whose output controls an electrical torque motor and an electrical or hydraulic servomotor unit 161 to actuate the elevators 85 of the craft to effect a change in altitude. This action will continue until the altitude has changed by such an amount that the expansion or contraction of bellows 101, operating through magnifying linkage 107, 111 and gearing 117, 119 has restored pick-off armature 123 to a central or balanced position with respect to pick-off housing 125 and its coils, at which time the signal across terminals 135 disappears and the elevators 85 return to their centralized position. Thereafter, the craft will maintain constant altitude, as any change in altitude will at once operate to drive the craft back to its original altitude.

Since shaft 121 is actuated directly from bellows 101, it will be clear that its position is indicative of the craft altitude. Hence, a suitable altitude indicator could be actuated directly from this shaft. Also, since pick-off housing 125 is caused to follow-up pick-off armature 123 which is connected to shaft 121, its position also is indicative of altitude, and a suitable indicator may be provided therefor.

In order to permit adjustment of the automatic constant altitude control just described, housing 125 has formed on or fixed to the outside thereof a gear 139 and may be positioned from an altitude control 143, as by way of shaft 145, gear 147, differential 149, shaft 151 and differential 140.

In operation, the operator will set the housing 125 in the position corresponding to the desired altitude as by means of altitude control knob 143. If the craft is not already at this altitude, pick-off armature member 123 will not be centralized with respect to housing 125 and accordingly a voltage will be produced across terminals 135 corresponding to the desired sense of change of altitude and corresponding in magnitude, at least up to the maximum output of the pick-off device, to the desired amount of change of altitude. This signal voltage appearing across terminals 135 will operate as described above to reposition the craft in altitude until bellows 101 recentralizes armature 123. The maximum signal output of pick-off 124 may be chosen so that the resultant actuation of the craft elevators will not produce too steep a change in altitude.

If a constant rate of climb or glide is desired, this may be provided by continuously rotating pick-off housing 125 at a constant rate. When this is done, the craft, as described above, is controlled to change its altitude to maintain pick-off armature 123 centralized with respect to housing 125 and hence the craft must continuously rotate shaft 121 by changing its altitude at the same rate as housing 125. Such a constant rotation of housing 125 is obtained from a constant speed motor 163, which drives a disc 165 forming a part of a ball and disc type of variable speed drive 167. Cylinder 177 is connected to a shaft 179 and by way of a gear 181 to the third member differential 149, and thence to housing 125. By this means pick-off housing 125 is continuously rotated at constant speed from constant speed motor 163, the speed of rotation depending upon the setting of ball carriage 171 by means of an altitude rate control 169. It will be clear that any other suitable type of variable speed drive may be used here, such as that shown in copending application Serial No. 428,030. There is thus provided a climb and glide control having adjustable constant rates of climb or glide, which may be indicated on the altitude rate dial 172 cooperating with a fixed index 174 and rotated by altitude rate control 169.

It will be seen that the motion of arm 107 connected to bellows 101 will not vary linearly with altitude because of the non-linear variation of atmospheric pressure with altitude. In order that the same sensitivity of control may be obtained at different altitudes and in order that the rate of climb or glide produced in the manner just described be constant over wide ranges of altitude, non-linear linkage 107, 111 is provided, being in effect an eccentric connection, and providing the proper non-linear motion of shaft 107 with respect to altitude to result in a linear rotation of shafts 113 and 121 with altitude over a wide range of altitudes.

The purpose of the slight air pressure left in bellows 101 should now be clear. Thus, temperature effects will cause expansion or contraction of the casing 102 housing the system, so that the separation, for instance, of bracket 115 and fixed support 106 of bellows 101 will vary, as will the bellows 101 due to change in size of its metal container. Such action would produce an apparent rotation of shaft 113 with respect to bracket 115, and would therefore effect a change of position of pick-off armature 123, and the craft would change its altitude in the manner described. To prevent this action, a slight amount of air is left within bellows 101 so that temperature changes will cause an increase or decrease of pressure within the bellows 101, resulting in the slight extension or retraction just necessary to compensate for the effect of the expansion or contraction of casing 102 and bellows 101 just described. The system is thereby effectively compensated against temperature effects.

In order to prevent too great and too sudden a change in altitude upon first activating the automatic altitude control, it is desirable to maintain pick-off armature 123 continuously centralized with respect to pick-off housing 125 when the altitude control is not in use, so that activation of the altitude control will merely result in automatic level flying at the attained altitude. One manner of producing this result is included in Fig. 1. Thus, the output signal voltage appearing between wires 135 is connected to a double-pole two-position switch 157. In its upper position, this switch connects the signal voltage to amplifier 159 to control the elevators 85 in the manner already described. In the lower position of switch 157, the signal voltage is connected through an amplifier 162 of any suitable type and double-pole double-throw switch 164 (when in the up position) to a motor 166 connected to rotate housing 125, through the third member of differential 140. Motor 166 is illustrated as being of the two phase induction type, having one field winding energized directly from a source 168 of alternating current and its second field winding fed from the output of amplifier 162 when switch 164 is in the up position. Suitable means are provided either in amplifier 162 or motor 166 to insure that the energizations of the two windings will be in phase quadrature. It will be clear that any suitable type of reversible motor 166 may be used; if a D. C. motor is used, the output of amplifier 162 should then provide reversible polarity D. C. output.

The system described provides in effect a closed follow-up system whereby the motor 166 continuously drives pick-off housing 125 to follow the position of pick-off armature 123 as altitude changes. In this way, when the craft, for instance, first takes off, with the automatic altitude control unenergized, the pick-off 124 is kept continuously centralized or zeroed so that, after attaining any desired altitude, the operator may immediately actuate the altitude control merely by throwing switch 157 from the down to the up position, and thereby have the automatic altitude control at once take over and maintain the attained altitude of the craft without any sudden changes.

When switch 164 is in the down position, motor 166 is energized directly from power source 168, and will rotate continuously, thereby rotating pick-off housing 125. This provides an altitude control equivalent to control 143, but now power-operated. Switch 164 may be positioned at any suitable control point, remote from the entire apparatus, if desired. It may be made as a momentary contact switch normally in the up position and operable to the down position by the operator.

Fig. 2 shows a modified type of zeroing or centralizing device for pick-off 124. Thus, instead of providing switch 157, amplifier 162 and motor 166 to continuously reposition pick-off housing 125 as the altitude changes, a magnetic or electrically actuated clutch 183 is interposed between shaft 121 and pick-off armature member 123. Also, a spring centralizing device 185 is connected to maintain pick-off armature 123 centralized with respect to housing 125 whenever clutch 183 is deenergized. Centralizing device 185 includes plate 218 fixed to pick-off armature 123 by shaft 217. A second plate 223 surrounds shaft 217 without interfering with rotation thereof. Plates 218 and 223 carry respective pins 220 and 221 which are resiliently maintained in juxtaposition by U-shaped spring 222. Plate 223 is adjustably fixed with respect to the pick-off housing 125 by means of a pin and slot arrangement 226, 227 and bracket 215.

The clutch leads 230 are connected to a suitable source 240 of electrical energy through the left pair of contacts of switch 157'. The pick-off output leads 135 are connected to the amplifier 159 through the right pair of contacts of switch 157', which replaces switch 157 of Fig. 1.

Switch 157' is arranged so that in the left position clutch 183 is energized to connect bellows 101 to armature 123 and at the same time to supply the pick-off output to amplifier 159. In the right position of switch 157', the amplifier 159 is disconnected from the pick-off 124 and clutch leads 230 are deenergized to release armature 123 from the influence of shaft 121. Under these circumstances, spring 222 forces pin 220 into juxtaposition with the relatively fixed pin 221 and thereby turns armature 123 to the centralized position with respect to housing 125.

It will be understood that the spring centralizing device 185 is made sufficiently weak so that the bellows 101 is not overloaded by this spring loading when the clutch 183 is energized. If desired, any suitable type of torque amplifier or follow-up device may be connected between bellows 101 and pick-off armature 123.

The above description of the operation has been based on the assumption that pure altitude control was used; that is, only the altitude signal derived from pick-off 124 controls the craft elevators, as just described. In practice, however, the above control is best used with an automatic pilot system which may be of the same type as the altitude servo system just described. In such case, the signal voltage appearing across wires 135 may be connected in series or otherwise combined with the pitch signal voltage of the automatic pilot, which may be connected to terminals 155. In such a case, the elevator control signal operating servo 161 and elevators 85 will be the difference between the altitude signal and the pitch signal. This operates to keep the craft under the control of the gyro-vertical at all times and to limit the steepness of the angle of climb or glide performed to restore altitude, since the steeper the angle, the greater will be the anti-pitch signal produced, resulting in increase in the final elevator control signal.

While the above described construction has certain advantages, greater sensitivity of response to altitude changes may be secured by resetting the zero or neutral point of the pitch pick-off proportionately to rate of change of altitude, so that an inclination of the craft in pitch proportional to altitude rate will be permitted without creating any opposing pitch signal. Such a system is shown in Figs. 3 and 4, in association with the system of Fig. 1.

Fig. 3 shows a conventional gyro vertical 67 such as used in automatic pilots, universally mounted in gimbal rings 69 and 71, the outer ring 71 being fixed to the craft. Fixed to the pitch axis 187 of gyro vertical 67 is pitch pick-off device 189 which may be of the conventional "Selsyn" or "Autosyn" signal generator type having the casing 191 fixed to the craft and rotor 193 connected to the pitch axis 187 of gyro vertical 67.

As shown in Fig. 4, the rotor of such a pick-off device 189 may have a single-phase-type winding energized from a suitable source 195 of alternating current, whereas the stator winding 191 may be of the polyphase type. The output voltages induced in stator 191 may be connected as by wires 197 to a differential "Selsyn" type of device 200 comprising two relatively rotatable members 199 and 201, each carrying a corresponding polyphase type winding, one of these windings 199 being connected directly to the output of winding 191. The other winding 201 may be connected as by wires 203 to another "Selsyn" type device or signal generator 205 similar to 189 and having its single-phase-type 207 winding connected to terminals 155 of the elevator servo control system shown in Fig. 1.

As is well known, with members 199 and 201 of differential device 200 maintained in their normally fixed positions, the voltage appearing across terminals 155 will correspond in magnitude and phase to the magnitude and sense of the displacement of winding 193 from a predetermined position with respect to winding 191, this predetermined position being determined by the relative positions of the windings of the device 205.

In this manner, for a certain attitude of the craft about its pitch axis the signal across wires 155 will be zero. If the craft should change this attitude for any reason, rotor 193 of pick-off device 189 will remain fixed in space, since it is rigidly connected at least in pitch to the gyro vertical. However, stator 191 will move with the craft, thereby changing the relative positions of rotor 193 and stator 191. This, in turn, will produce a voltage output across wires 155 corresponding in magnitude and phase to the magniture and sense of the displacement produced between rotor 193 and stator 191, and hence corresponding in magnitude and sense to the change in pitch of the craft.

As has been already described, this signal may be used to correct the change in attitude of the craft and to bring the craft back to the attitude in which this signal is caused to be zero. If a change in attitude is desired, as to correct the trim of a craft due to changing in loading, etc., this may be produced by displacing rotor 207 of device 205 with respect to its corresponding stator 209 as by means of the pitch control knob 208 connected to rotor 207. This in effect changes the neutral position of pick-off 189 at which the output signal is zero, and as a result the craft must change its attitude to again seek this neutral position. Pitch control 208 may be positioned remotely from the rest of the apparatus and thereby serves as a type of remote control. Thus, the actual attitude control apparatus may be mounted at any suitable position in the craft, while the control 208 may be positioned at the pilot's control position. This feature, however, is not claimed broadly herein, but in the copending application of Frische, Halpert and Wilkerson, Serial No. 452,662, filed July 28, 1942, for Automatic pilot with automatic banking, assigned to a common assignee.

Differential device 200 normally has its rotor 199 maintained fixed with respect to its stator 201 during ordinary flight operations and thereby has no effect on the system. However, as explained above, it may be desirable to eliminate the effect of change in pitch attitude of the craft during constant rate of change of altitude. This may be done in the present device by repositioning rotor 199 of differential device 200 in accordance with the actuation of altitude rate control. Thus, as shown in Fig. 4, rotor 199 is adapted to be displaced simultaneously with shaft 170 by means of altitude rate control 167, through gears 211, 213 and 215 engaging rotor 199. It is to be understood that altitude rate control 169 in Fig. 4 is identical with that in Fig. 1, and its shaft 170 is connected to pinion 173 as in Fig. 1 to actuate the glide and climb apparatus already described.

By thus combining the altitude rate control with the displacement of rotor 199 of differential device 200, the zero or neutral point of the pitch control apparatus of the aircraft is displaced correspondingly and proportionately, so that during constant rate of change of altitude the normal pitch control of the craft is compensated for the change in attitude in pitch required to produce this constant rate of change of altitude. However, it is to be observed that the automatic pitch control derived with reference to the gyro vertical 67 is still fully effective, and should the attitude of the craft in pitch deviate in any way from that required to produce the desired constant rate of change of altitude, the gyro vertical will operate to restore the attitude of the craft to the required attitude in pitch.

It is to be noted that the device of Fig. 4 is of wider application than in the illustration just described. Thus, effectively the pitch control of the craft is made controllable from two points, namely, from the position of pitch control 208 and also from control 169. Both of these controls may be situated remotely from the remainder of the apparatus, and each can fully control the attitude of the craft in pitch independently of the other. Thus, if it is desired to produce two separate remote control stations, the system of Fig. 4 may be used by having differential device 200 situated at one control station with its rotor 199 actuated by a suitable control at that station, and by having signal generator device 205 situated at the other control station with its rotor 207 controlled from a suitable control 208.

It will be understood, of course, that the present type of control is not restricted in any way to controlling the pitch of an aircraft, but may control course, or attitude in roll, or may be responsive to any other type of condition which it is desired to maintain.

It will also be evident that a system such as in Fig. 4 need not be restricted merely to two control positions, since any number of differential devices similar to 200 may be inserted in cascade in the system, each thereby providing an independent control for the operation of the system.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described our invention, what we claim and desire to secure by Letters Patent is:

1. An altitude control for aircraft comprising an expansible sealed bellows, means subjecting the exterior of said bellows to static air pressure, a pick-off device comprising a housing mounted on said craft carrying four symmetrically disposed field poles bearing windings and a semi-cylindrical magnetic armature, means for rotating said armature with respect to said housing in response to expansion and contraction of said bellows, means for energizing one pair of opposed windings of said pick-off device by alternating current in such manner that said pair of windings simultaneously exhibit like magnetic polarity, means for connecting the other pair of said windings in opposition, whereby there is produced across said other pair of reversible-phase variable-magnitude alternating signal voltage corresponding in phase and magnitude to the sense and magnitude of the relative displacement between said armature and said housing, servo means for actuating the elevators of said craft, and means for controlling said servo means by said signal voltage, whereby said craft is caused to fly at an altitude at which said armature and housing have zero relative displacement.

2. An altitude control for aircraft comprising an altitude-responsive device, a pick-off device having a datum-defining member carried by said craft and a sensitive element, means for positioning said sensitive element by said altitude-responsive device, means for producing a reversible-phase variable magnitude alternating signal voltage corresponding in phase and magnitude to the sense and magnitude of the relative displacement between said datum member and said sensitive element, means for changing the altitude of said craft, including servo means, means for controlling said servo means by said voltage to change the altitude of said craft in such sense as to reduce said relative displacement, and other means for continuously rotating one element of said pick-off at a predetermined constant speed, whereby said craft is caused to fly at an altitude at which said sensitive element and said datum member have zero relative displacement or to ascend or descend at a predetermined rate.

3. An aircraft control device comprising a gyro vertical, pick-off means cooperating with said gyro-vertical for producing an alternating signal voltage corresponding in phase and magnitude to the sense and magnitude of pitch of said craft with respect to said gyro-vertical, an altimeter, pick-off means cooperating with said altimeter for producing a second alternating signal voltage corresponding in phase and magnitude to the sense and magnitude of departure of said craft from a predetermined altitude, means for combining said signal voltages, and means under control of said combined voltage for changing the attitude of said craft in pitch to return said craft to level flight at said predetermined altitude upon departure of the craft from either of said flight conditions.

4. An aircraft control device comprising means for generating an alternating signal voltage corresponding in phase and magnitude to the sense and magnitude of departure of said craft from a predetermined altitude, means for generating an alternating signal voltage corresponding in phase and magnitude to the sense and magnitude of departure of said craft from a predetermined attitude in pitch, means for combining said signals, and means under the control of said combined signal for changing the attitude of said craft in pitch to return said craft to said predetermined attitude and altitude.

5. An aircraft control device comprising means for producing a signal voltage corresponding to departure of said craft from a predetermined altitude, means for producing a signal voltage corresponding to departure of said craft from a predetermined attitude, means for combining said voltages, means for controlling the attitude of said craft by said combined signal to return said craft to said predetermined attitude and altitude, and means for changing at a predetermined rate said first-named signal voltage for causing the craft to ascend or descend at a predetermined rate.

6. An aircraft control device comprising pick-off means for producing a signal voltage corresponding to departure of said craft from a predetermined attitude, pick-off means for producing a signal voltage corresponding to departure of said craft from a predetermined altitude, means for combining said signals, means for controlling the attitude of said craft by said signals to maintain said predetermined attitude and altitude, means for changing said predetermined altitude at a constant predetermined rate, and means for changing the zero of said attitude pick-off means by an amount corresponding to said rate of change of altitude.

7. In a disconnectable automatic pilot for aircraft, a sensitive instrument, a two-part pick-off therefor, one part being positioned by said instrument, a servomotor actuated by the output of said pick-off for governing the attitude of the craft about one of its normally horizontal axes, a second normally inoperative servomotor for positioning the second part of said pick-off, and two-position switch means interposed between said pick-off and said servomotors, whereby upon disconnection of the pick-off from the first servomotor, the second servomotor is brought under control of said pick-off, thereby maintaining the second part of said pick-off in the zero position when said pilot is disconnected, whereby the attitude of the craft is never suddenly changed when the pilot is thrown in.

8. In an automatic altitude control for aircraft, a barometric device, a two-part pick-off therefor, one part being positioned by said device, a disconnectable servomotor actuated by the output of said device for causing the craft to climb or descend, a second normally inoperative servomotor connected to the second part of said pick-off, and two-position switch means interposed between said pick-off and said servomotors, whereby upon disconnection of the pick-off from the first servomotor, the second servomotor is brought under control of said pick-off, whereby sudden changes in altitude will not occur on the throwing in of said first servomotor.

9. An altitude control for aircraft comprising an altimeter, means including a two-part pick-off device having a sensitive element actuated by said altimeter and a datum-defining member, for producing a signal voltage upon relative displacement of said sensitive element and said datum member, means for controlling the altitude of said craft by said signal voltage, whereby said craft is caused to fly at an altitude at which said sensitive element and datum member have zero relative displacement, means for rendering said altitude-controlling means inoperative, and means for automatically bringing the two parts of said pick-off into zero position upon rendering said altitude-controlling means inoperative.

10. An automatic altitude control for aircraft comprising an altimeter, a pick-off thereon having a sensitive element actuated by said altimeter and a datum-defining member, an elevator servomotor controlled by the output of said pick-off, a variable speed drive for altering the position of said datum member at a predetermined rate, a gyro-vertical, a pick-off thereon for also controlling said servomotor, manual setting means for said variable speed drive, and means actuated by said manual setting means for also altering the output signal of said last-named pick-off proportionally to the speed setting of said variable speed drive to thereby cause a change in attitude of the craft through an angle proportional to the desired rate of change of altitude.

11. An aircraft control device comprising means for producing a signal voltage corresponding to departure of said craft from a predetermined altitude, a settable variable speed drive for continuously altering the setting of said means for causing a constant rate of change of altitude, means for producing a signal voltage corresponding to departure of said craft from a predetermined attitude, means connected to said rate-setting means for in effect altering the zero of said attitude signal means, and means for controlling the attitude of said craft by the combined signals to maintain said craft level at a predetermined altitude or climbing or descending at a predetermined rate.

12. An automatic altitude control for aircraft comprising an altimeter, a pick-off thereon having a sensitive element actuated by said altimeter and a datum-defining member, an elevator servomotor controlled by the output of said pick-off, a variable speed drive for altering the position of said datum member at a predetermined rate, a control knob for setting said drive at a predetermined rate, and a second control knob for directly moving said datum-defining member for making changes of altitude of a predetermined amount.

13. In an automatic pilot for aircraft having an elevator, a barometric device for governing the altitude through said automatic pilot, two-part pick-off means thereon for generating a signal on departure of the craft from any predetermined altitude, servo means controlled by the output of said pick-off for adjusting the elevator of the craft, and means for causing a constant rate of change of altitude causing climbing or descending at such rate, including variable speed motive means connected to move one of the parts of the pick-off means at a desired constant rate.

14. In an automatic pilot for aircraft having an elevator, a barometric device for governing the altitude through said automatic pilot, two-part pick-off means thereon for generating a signal on departure of the craft from any predetermined altitude, means for selectively rendering said pick-off inoperative to control the altitude, and automatic means for maintaining the relative displacement of the two parts of said pick-off means at zero during such period of disconnection, whereby sudden changes of altitude of the craft will not occur on re-establishment of altitude control.

15. An altitude control as claimed in claim 14, wherein said last-named means includes a clutch for disconnecting said pick-off from the barometric device and spring means for centralizing said pick-off, whereby the output is zero upon re-establishment of the connections.

16. An altitude control as claimed in claim 14, wherein said last-named means includes a normally inoperative auxiliary servomotor for positioning one element of the pick-off with respect to the other, and means for transferring the signal generated by said pick-off from said main servo to said auxiliary servo when the elevator is disconnected.

17. In an elevator control for automatic pilots for aircraft, a gyro vertical having a Selsyn generator at the pitch axis thereof, a two-part differential transformer having one part connected electrically to the output of said Selsyn, manual means for mechanically shifting one of the parts of said differential transformer with respect to the other in accordance with a desired rate of pitch of the craft, a second Selsyn generator electrically connected with the output of said differential transformer, manual means for adjusting the same for trimming the craft about its pitch axis and a pitch servomotor controlled by the output of said last-named Selsyn generator.

SPENCER KELLOGG, 2ND.
GERALD N. HANSON.
THEODORE W. KENYON.

REFERENCES CITED

The following references are of record in the file of this patent:

UNITED STATES PATENTS

| Number | Name | Date |
|---|---|---|
| 2,203,671 | Carlson | June 11, 1940 |
| 2,155,401 | Carlson | Apr. 25, 1939 |
| 2,091,306 | Carlson | Aug. 31, 1937 |
| 2,191,250 | Fischel | Feb. 20, 1940 |
| 2,152,144 | Minelli | Mar. 28, 1939 |
| 2,207,248 | Garlick | July 9, 1940 |
| 1,897,415 | Barbour | Feb. 14, 1933 |
| 1,944,721 | Sell | Jan. 23, 1934 |
| 1,822,184 | Wunsch | Sept. 8, 1931 |
| 1,625,252 | Hammond | Apr. 19, 1927 |
| 1,997,412 | Fischel | Apr. 9, 1935 |
| 1,447,584 | Zahn | Mar. 6, 1925 |
| 2,091,300 | Bassett et al. | Apr. 31, 1937 |
| 2,139,558 | Moseley et al. | Dec. 6, 1938 |
| 2,166,603 | Menzer | July 18, 1939 |
| 1,351,130 | Roesch | Aug. 31, 1920 |

FOREIGN PATENTS

| Number | Country | Date |
|---|---|---|
| 339,711 | British | Dec. 18, 1930 |
| 13,761 | British | 1913 |